(12) United States Patent
Chou et al.

(10) Patent No.: US 7,751,613 B2
(45) Date of Patent: Jul. 6, 2010

(54) METHOD FOR RAPIDLY ESTABLISHING IMAGE SPACE RELATION USING PLANE FILTERING CONSTRAINT

(75) Inventors: Hong-Long Chou, Taipei (TW); Cheng-Yuan Tang, Sanchong (TW); De-Jin Shau, Taichung (TW); Fu-Jen Hsiao, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 1134 days.

(21) Appl. No.: 11/393,190

(22) Filed: Mar. 29, 2006

(65) Prior Publication Data

US 2007/0058855 A1 Mar. 15, 2007

(30) Foreign Application Priority Data

Sep. 13, 2005 (TW) .............................. 94131432 A

(51) Int. Cl.
*G06K 9/00* (2006.01)
*G06K 9/36* (2006.01)
*G06T 15/00* (2006.01)
*G06T 17/00* (2006.01)
*G06T 15/10* (2006.01)

(52) U.S. Cl. ................. 382/154; 382/103; 382/107; 382/284; 345/419; 345/420; 345/427

(58) Field of Classification Search ............... 382/103, 382/107, 154, 284; 345/419, 420, 427
See application file for complete search history.

(56) References Cited

U.S. PATENT DOCUMENTS 5,821,943 A * 10/1998 Shashua ................ 345/427
5,859,922 A * 1/1999 Hoffmann ............... 382/128
5,864,640 A * 1/1999 Miramonti et al. ......... 382/312
5,872,571 A * 2/1999 Arling ................... 345/427
6,137,491 A * 10/2000 Szeliski ................. 345/419
6,198,852 B1 * 3/2001 Anandan et al. ........... 382/284
6,348,918 B1 * 2/2002 Szeliski et al. ............ 345/419
6,353,678 B1 * 3/2002 Guo et al. ............... 382/154
6,571,024 B1 * 5/2003 Sawhney et al. ........... 382/154

(Continued)

OTHER PUBLICATIONS

Zhangyou Zhang et al, A robust technique for matching two uncalibrated images through the recovery of the unknown epipolar geometry, Artificial Intelligence 78 (1995) pp. 87-119.

(Continued)

*Primary Examiner*—Wenpeng Chen
*Assistant Examiner*—Gandhi Thirugnanam
(74) *Attorney, Agent, or Firm*—J.C. Patents

(57) ABSTRACT

A method for rapidly building image space relation using plane filtering limitation is provided. The method comprises first getting a plurality of continuous image data taken from different shooting angles. Then, a plurality of feature points of the image data is initialized. Next, a number of feature points of those image data is randomly extracted and compared to determine whether the compared feature points are coplanar or not. When the selected feature points are not coplanar, an epipolar fundamental matrix is calculated according to the selected feature points. On the contrary, when the selected feature points are coplanar, a medium error value for all the feature points is set as a maximum value.

7 Claims, 6 Drawing Sheets

U.S. PATENT DOCUMENTS

| | | | |
|---|---|---|---|
| 6,771,810 B1 * | 8/2004 | Zhang et al. | 382/154 |
| 2005/0169543 A1 * | 8/2005 | Damera-Venkata | 382/236 |
| 2007/0058855 A1 * | 3/2007 | Chou et al. | 382/154 |

OTHER PUBLICATIONS

Alan Watt, "The Graphics Pipeline (1): Geometric Operations—Operations Carried Out in View Space" 3D Computer Graphics, Third Edition, Addison-Wesley, pp. 148-157.

Rafael C. Gonzalez et al., "Image Restoration—Noise Models" Digital Image Processing, Second Edition, Prentice hall International Edition, pp. 222-243.

H. C. Longuet-Higgins, "A computer algorithm for reconstructing a scene from two projection" Nature, vol. 293, Sep. 10, 1981, pp. 133-135.

Roger Y. Tsai et al., "Estimating Three-Dimensioinal Motion Parameters of a Rigid Planar Patch, II: Singular Value Decomposition" IEEE Transactions on Acoustics, Speech, and Signal Processing, vol. ASSP-30, No. 4, Aug. 1982, pp. 525-534.

Rogery Y. Tsai et al., "Estimating Three-Dimensional Motion parameters of a Rigid Planar Patch" IEEE Transactions on Acoustics, Speech, and Signal Processing, vol. ASSP-29, No. 6, Dec. 1981, pp. 1147-1152.

Roger Y. Tsai, "A Versatile Camera Calibration Technique for High-Accuracy 3D Machine Vision Metrology Using Off-the-Shelf TV Cameras and Lenses" IEEE Journal of Robotics and Automation, vol. RA-3, No. 4, Aug. 1987, pp. 323-344.

Marc Pollefeys et al., "Stratified Self-Calibration with the Modulus Constraint" IEEE Transactions on Pattern Analysis and Machine Intelligence, vol. 21, No. 8, Aug. 1999, pp. 707-724.

Marc Pollefeys, "Self-Calibration and Metric 3D Reconstruction From Uncalibrated Image Sequences" Katholieke Universiteit Leuven, 1999.

* cited by examiner

METHOD FOR RAPIDLY ESTABLISHING IMAGE SPACE RELATION USING PLANE FILTERING CONSTRAINT

CROSS-REFERENCE TO RELATED APPLICATION

This application claims the priority benefit of Taiwan application serial no. 94131432, Sep. 13, 2005. All disclosure of the Taiwan application is incorporated herein by reference.

BACKGROUND OF THE INVENTION

1. Field of the Invention

The present invention relates to a method for rapidly establishing the 3D space relation of captured images. More particularly, the present invention relates to a method for rapidly building an image space relation using plane filtering constraint.

2. Description of the Related Art

Three-dimensional information reconstruction technique is one of the important research areas in the computer vision field. Through this technique, the computer can automatically determine the three-dimensional information of environmental objects through an image extraction system for subsequent processing and applications.

At present, the most common three-dimensional reconstruction technique includes using a DV camera to get a series of continuous images taken from different shooting angles such that each image contains a number of feature points. One major aspect of the three-dimensional reconstruction technique is to perform a matching operation of the consecutive images and look for their corresponding feature points so that a suitable projective geometry relation can be established between the images.

Let $\tilde{p}_1$ and $\tilde{p}_2$ be two feature points randomly selected from the two consecutive images taken at different angles. If these two feature points are projected from the same coordinate in three-dimensional (3D) space, then the two feature points satisfy the following formula:

$$\tilde{p}_1^T F_{3\times3} \tilde{p}_2 = 0, \text{ where } \tilde{p}_1 = \begin{bmatrix} u_1 \\ v_1 \\ 1 \end{bmatrix}, \text{ and } \tilde{p}_2 = \begin{bmatrix} u_2 \\ v_2 \\ 1 \end{bmatrix},$$

where $\tilde{p}_1$ and $\tilde{p}_2$ are two feature points and $F_{3\times3}$ is a 3×3 fundamental matrix representing the epipolar geometry formed by the two images.

Accordingly, the epipolar geometry, represented by a 3×3 fundamental matrix, connects the spatial relation between the camera intrinsic and extrinsic parameters and the 3D point coordinate of two captured pictures. Hence, it is for finding whether two feature points correspond to each other or not. The conventional method of finding the fundamental matrix is shown in FIG. 1. First, in step S101, eight matched pairs of feature points obtained by comparing samples are randomly selected from a set of continuous image data taken at different shooting angles. In step S102, the eight groups of feature points are used to compute the fundamental matrix. Then, in step S103, the error value of each selected feature point to an epipolar line is calculated to obtain a plurality of epipolar errors. Then, in step S105, the epipolar error values are sorted in order to find a median value in the error value list.

Step S107 determines if a computed value is equal to a preset value or not. If the computed value is not equal to the preset value, in step S109, the computed value is incremented by one and the steps starting from S101 are repeated. On the other hand, if the computed value is equal to the preset value, step S111 is carried out, that is, to find out the smallest median error by arranging each computed median error in a computation in order. Finally, step S113 is executed to calculate the epipolar geometry fundamental matrix using the smallest median error.

Although the conventional technique can accurately compute the values in the epipolar geometry matrix, the fundamental matrix computation for the corresponding feature points and the computation of the epipolar error value for each computed fundamental matrix require a lot of time. In the meantime, if the system demands to reconstruct a more accurate 3D mode, more times of fundamental matrix estimation from the median errors are required to compare and find the most suitable median error. Ultimately, system computation will be slowed down.

SUMMARY OF THE INVENTION

Accordingly, at least one objective of the present invention is to provide a method for rapidly establishing an image space relation using plane filtering constraint capable of finding the smallest median value faster for computing the accurate the epipolar geometry matrix. However, the feature points used for computing the epipolar geometry matrix must be non-coplanar. Therefore, in the present invention, the coplanar feature points are filtered before computing the epipolar geometry fundamental matrix so as to save the number of computational steps and prevent a waste of computational time.

To achieve these and other advantages and in accordance with the purpose of the invention, as embodied and broadly described herein, the invention provides a method of rapidly establishing an image space relation using plane filtering limitation. The method includes getting a plurality of continuous image data taken from different shooting angles. Then, a plurality of feature points of the image data is initialized. Next, a preset number of feature points of those image data is randomly selected to carry out the estimation of the fundamental matrix and determine whether the selected feature points are coplanar or not. When the selected feature points are not coplanar, an epipolar fundamental matrix computation is carried out using the selected feature points. On the contrary, when the selected feature points are coplanar, a medium error value is directly set as a maximum value so that the median error value found in the current computation will not be used to perform the epipolar geometry matrix computation. In this way, computational time can be substantially saved.

In one embodiment of the present invention, the steps for determining if the selected feature points are coplanar or not include: getting a planar transform matrix; one of the two groups of feature points is subtracted by multiplying the planar transform matrix with the values in the other group of selected feature points to produce a compared result; the compared result is checked to determine whether it has a value smaller than a threshold value or no; if the compared result has a value smaller than or equal to the threshold value, then the two groups of compared feature points are determined to be coplanar; otherwise, the two groups of compared feature points are determined to be non-coplanar.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
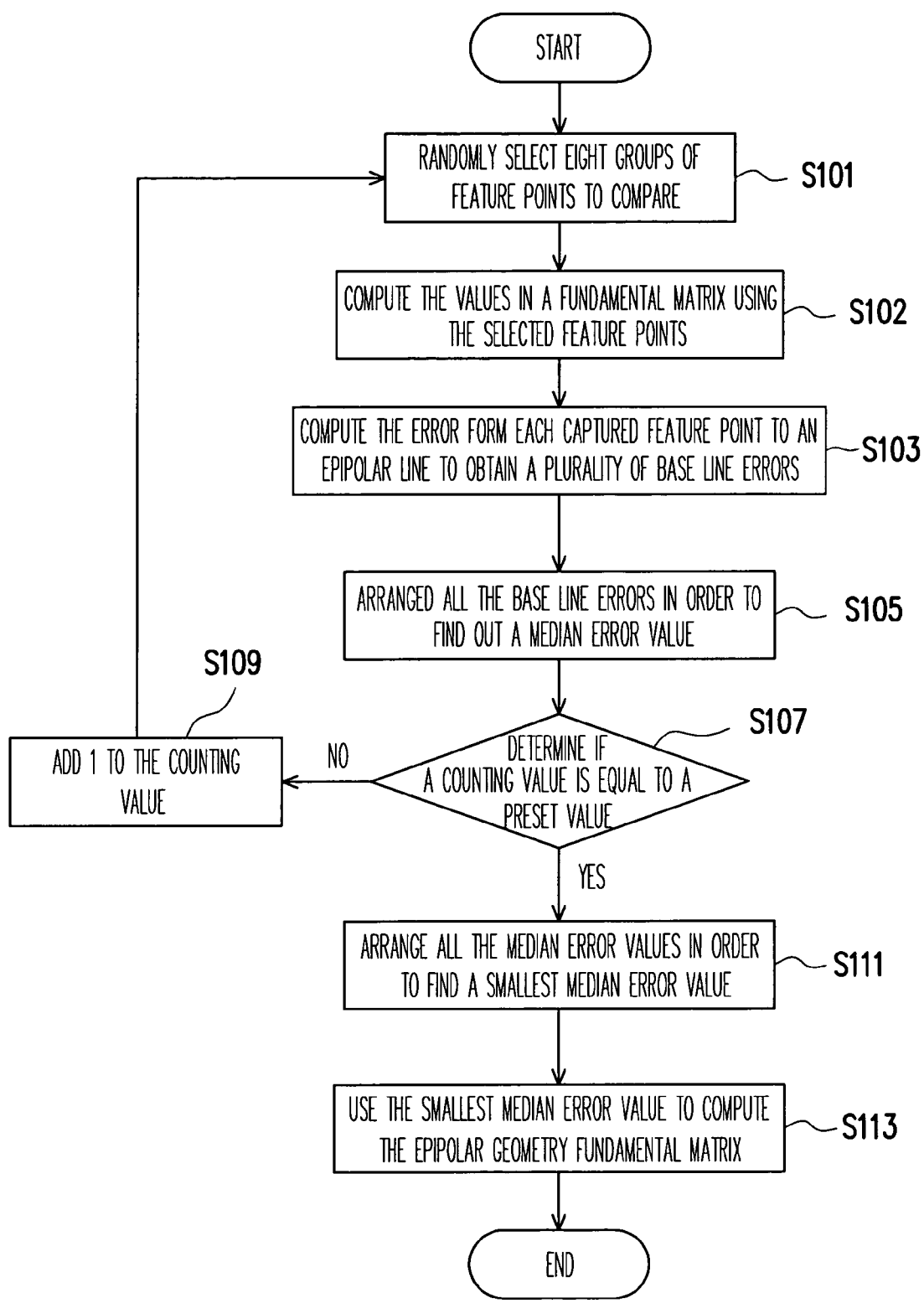
FIG. 1 is a flow diagram showing the steps for finding an epipolar geometry fundamental matrix in a conventional method.

Reference will now be made in detail to the present preferred embodiments of the invention, examples of which are illustrated in the accompanying drawings. Wherever possible, the same reference numbers are used in the drawings and the description to refer to the same or like parts.

Figure 2:
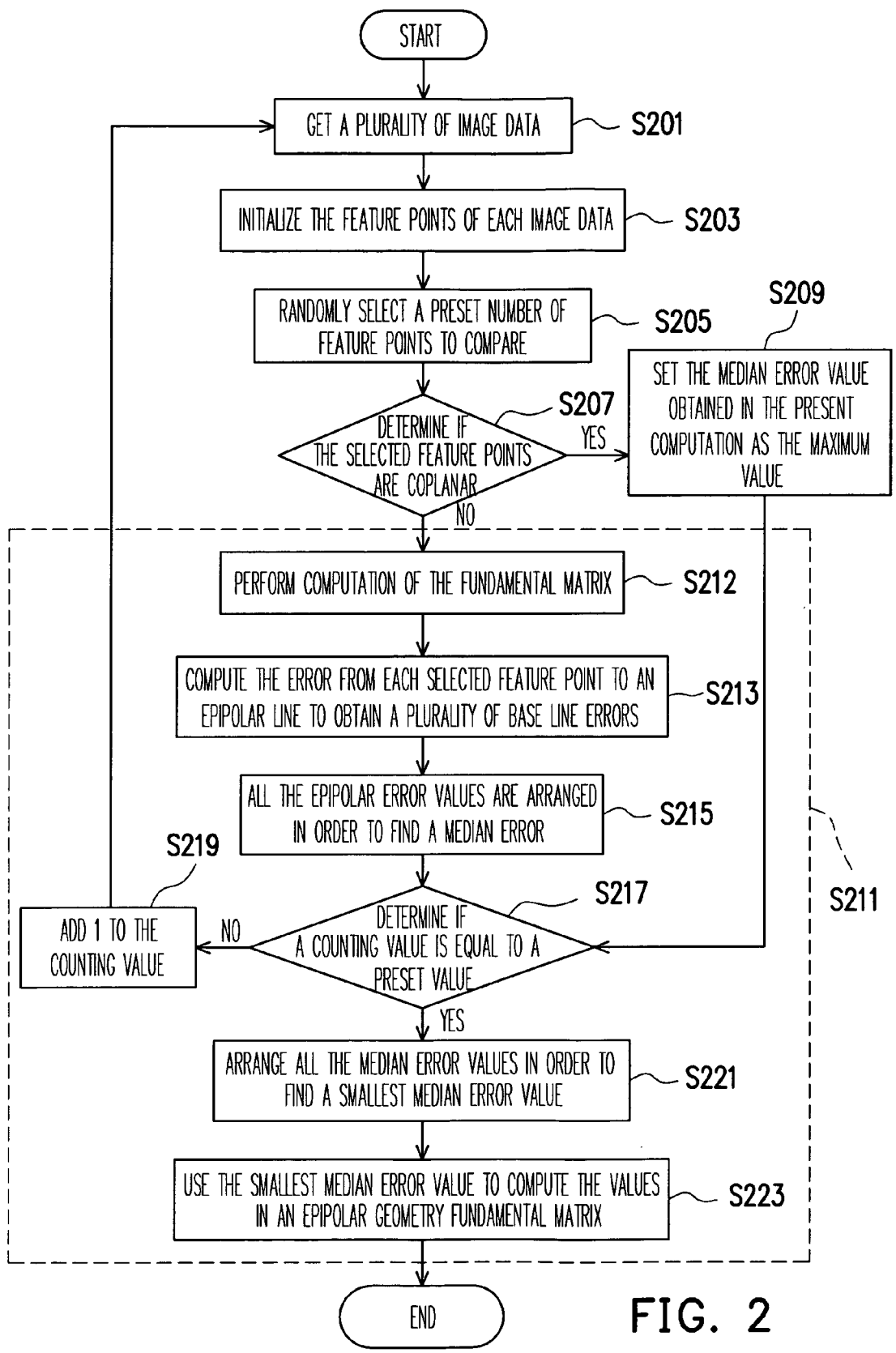
FIG. 2 is a flow diagram showing the steps for rapidly building an image space relation according to one preferred embodiment of the present invention.

FIG. 2 is a flow diagram showing the steps for rapidly establishing an image space relation according to one preferred embodiment of the present invention. As shown in FIG. 2, before computing the values in an epipolar geometric fundamental matrix, a plurality continuous imaging data taken at different shooting angles must be captured in step S201. Each image data contains a plurality of feature points. A detailed description of step S201 is shown in FIG. 3.

Figure 3:
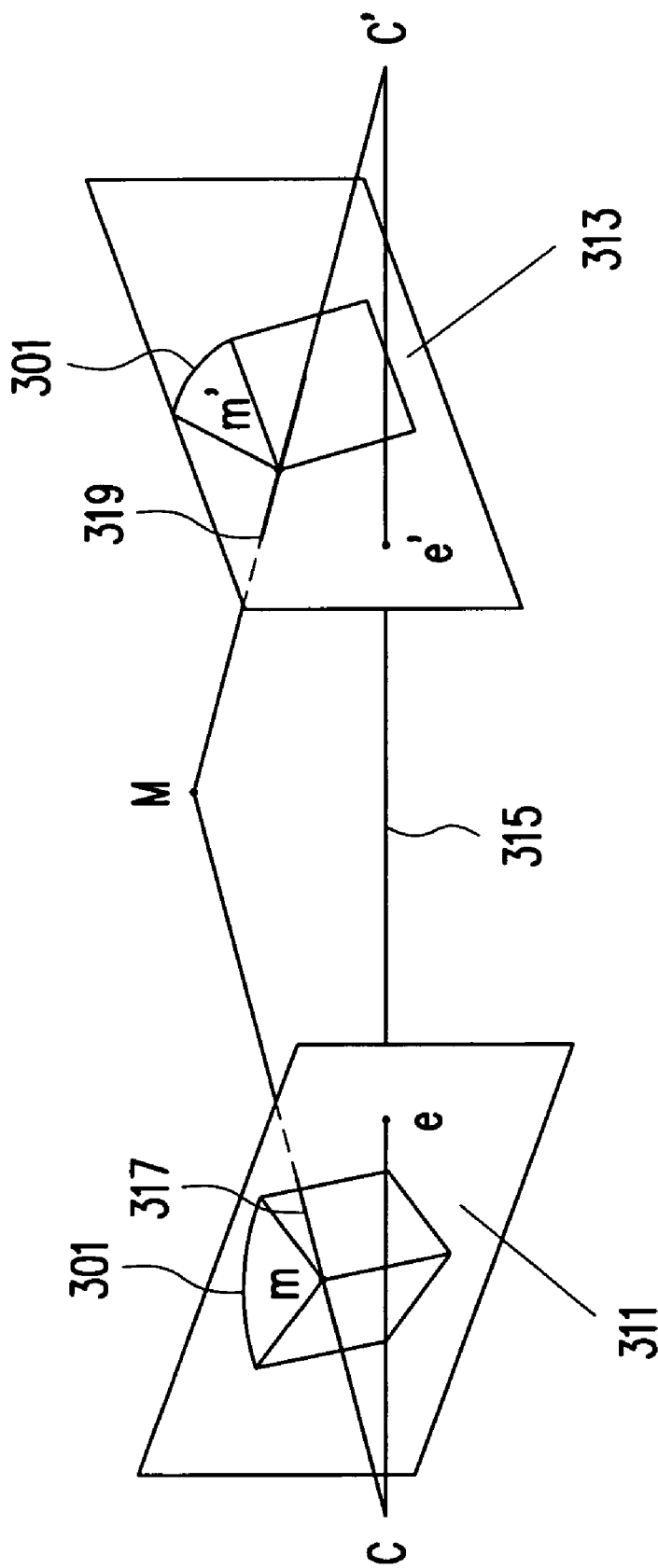
FIG. 3 is a diagram showing a continuous image data viewed from two different angles.

FIG. 3 is a diagram showing a continuous image data viewed from two different angles. Here, assume the user photographs an object 301 at two different shooting angles C and C' and captures two image data 311 and 313. The line segment 315 between C and C' is called a base line and the e and e' are the crossing points between the image data 311 and 313 and the base line 315. Furthermore, the points m and m' are the corresponding feature points in the image data 311 and 313 for the object 301 at actual location M in 3D space. Moreover, the image data 311 and 313 also include some other feature points of the object 301.

As shown in FIG. 2, after completing step S201, the feature points on each image data can be initialized in step S203 in a preferred condition. Then, in step S205, a preset number of feature points are selected from each image data to start off a computational determination of the fundamental matrix. Because the fundamental matrix is a 3×3 matrix, the preset number has to have a value greater than or at least equal to 8. After getting a plurality of feature points from the image data, the selected feature points are evaluated to determine if they are coplanar or not in step S207. If the selected feature points are non-coplanar (that is, "No" in step S207), then a computation to find the values in the epipolar geometry fundamental matrix is carried out in step 211.

Conversely, if any set of the selected feature points approach coplanar (that is, "Yes" in step S207), then step S209 is executed to set a median error value of the current computation as a maximum value. Then, the process goes to step S217 for determining whether a counting value is equal to a preset value or not. If the counting value is not equal to the preset value (that is, "No" in step S217), then the counting value is incremented by one in step S219 and the steps starting from S205 are repeated. That is, a preset number of pairs of feature points are randomly selected from each image data and compared again.

The following is a more detailed description of step S211. When the feature points used in the comparison are non-coplanar in step S207, step S212 is performed to compute the fundamental matrix. After estimating the 3×3 fundamental matrix, step S213 is carried out to compute the error from all the selected feature point to the corresponding epipolar line, for example, the error from the feature points m and m' to the epipolar lines 317 and 319. Hence, a plurality of epipolar error values is obtained. Then, in step S215, all the epipolar error values are arranged in order to find a median error. Then, in step S217, the counting value is checked to see if it is equal to the preset value or not. When the counting value is less than the preset value, the counting value is incremented by one and step S207 is repeated to begin the next round of computation.

Here, assume that the aforementioned preset value is n and the preset number in step S205 is p, where n and p are positive integers. After performing n computations, the present invention will obtain (n−s)×p median error values. Here, s is also a positive integer indicating that in s number of computations the selected feature points in step S205 are found to be coplanar. Therefore, the median error value in these s operations is directly set as the maximum value and will not be listed in the computation of the epipolar geometry matrix (a detailed description of the computation method for finding the epipolar geometry matrix is found in the following). Accordingly, there will be s×p fewer computations in steps S213 and S215. In the meantime, through statistical analysis, the order-arrangement operation in step S215 without filtering the coplanar feature points requires n×p×ln(p) of time units. If, according to step S207 mentioned in the present invention with filtering of coplanar feature points, the order-arrangement time in step S215 is only (n−s)×p×ln(p) time units. Consequently, the computational speed in the present invention is faster so that the epipolar geometry fundamental matrix can be obtained quicker.

When the counting value is equal to the preset value in step S217, in other words, after n computations, the present invention will obtain (n−s)×p median error values. Then, in step S221, these (n−s)×p median error values are arranged in order in step S221 and a smallest median error value is located and used for computing the epipolar geometry matrix according to step S223.

Figure 4:
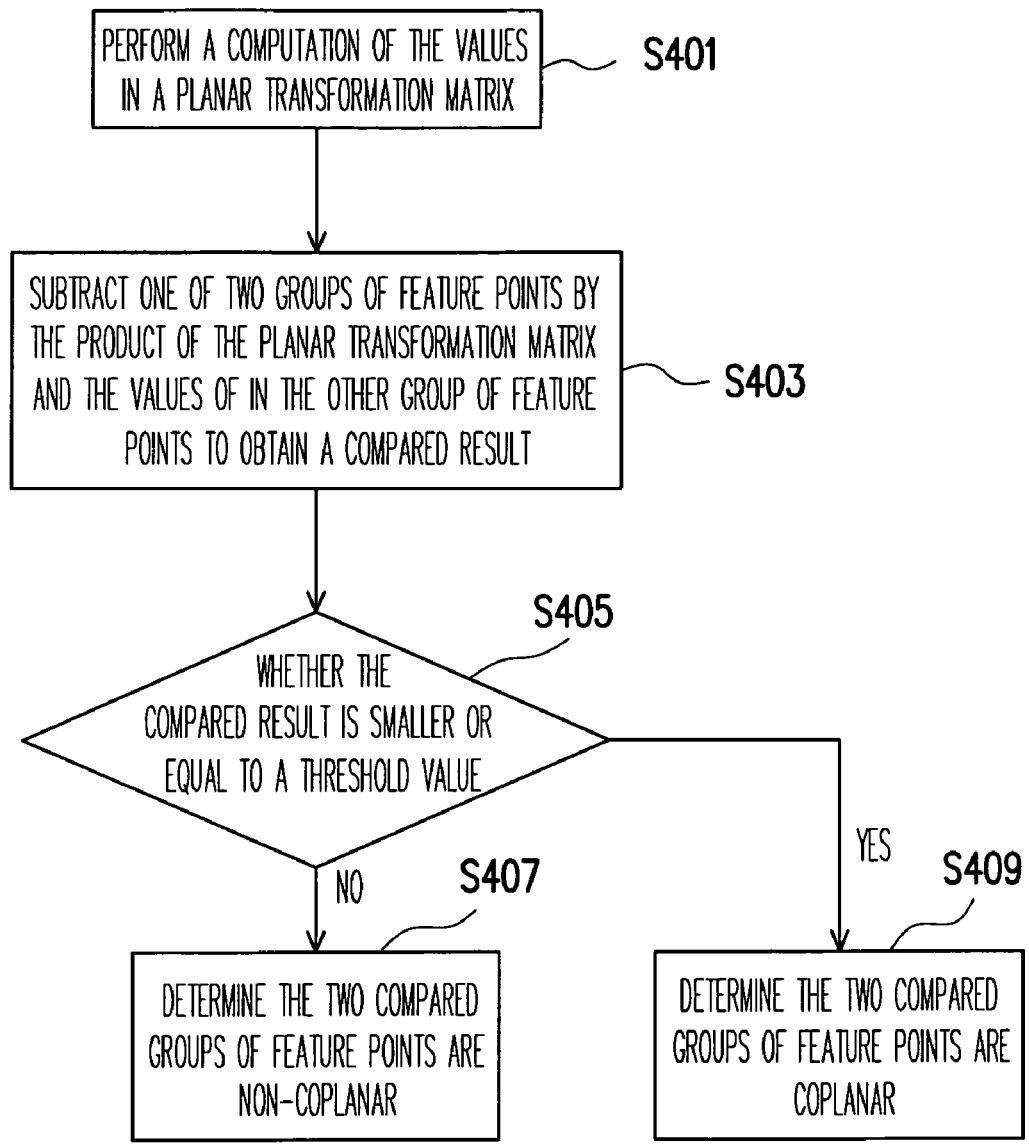
FIG. 4 is a flow diagram showing one method for determining whether compared feature points are coplanar or not according to one preferred embodiment of the present invention.

FIG. 4 is a flow diagram showing one method for determining whether compared feature points are coplanar or not according to one preferred embodiment of the present invention. As shown in FIG. 4, it is required to determine whether the compared feature points are coplanar as indicated in step S207 of FIG. 3. First, in step S401, the selected corresponding feature point groups are used to compute a planar transformation matrix ($M_{3\times3}$) Then, in step S403, the product of the planar transformation matrix and the other one of the two compared feature point value ($\tilde{p}_2$) is subtracted from one of the two compared feature point value ($\tilde{p}_1$) to obtain a compared result S. Step S403 can be represented by the following formula:

$$\tilde{p}_1 - \alpha M_{3\times 3}\tilde{p}_2 = S, \text{ where } \tilde{p}_1 = \begin{bmatrix} u_1 \\ v_1 \\ 1 \end{bmatrix} \text{ and } \tilde{p}_2 = \begin{bmatrix} u_2 \\ v_2 \\ 1 \end{bmatrix}$$

Under ideal condition, if the compared result S=0, then the two compared feature points are coplanar. Otherwise, the two feature points are non-coplanar.

In another embodiment, after obtaining the compared result in step S403, the compared result is assessed to determine whether it is smaller than or equal to a threshold value in step S405. When the compared result is greater than the threshold value ("No" in step S405), then the two feature points are determined to be non-coplanar. On the contrary, when the compared result is smaller than or equal to the threshold value ("Yes" in step S405), then the two feature points are determined to be coplanar in step S409.

Figure 5A:
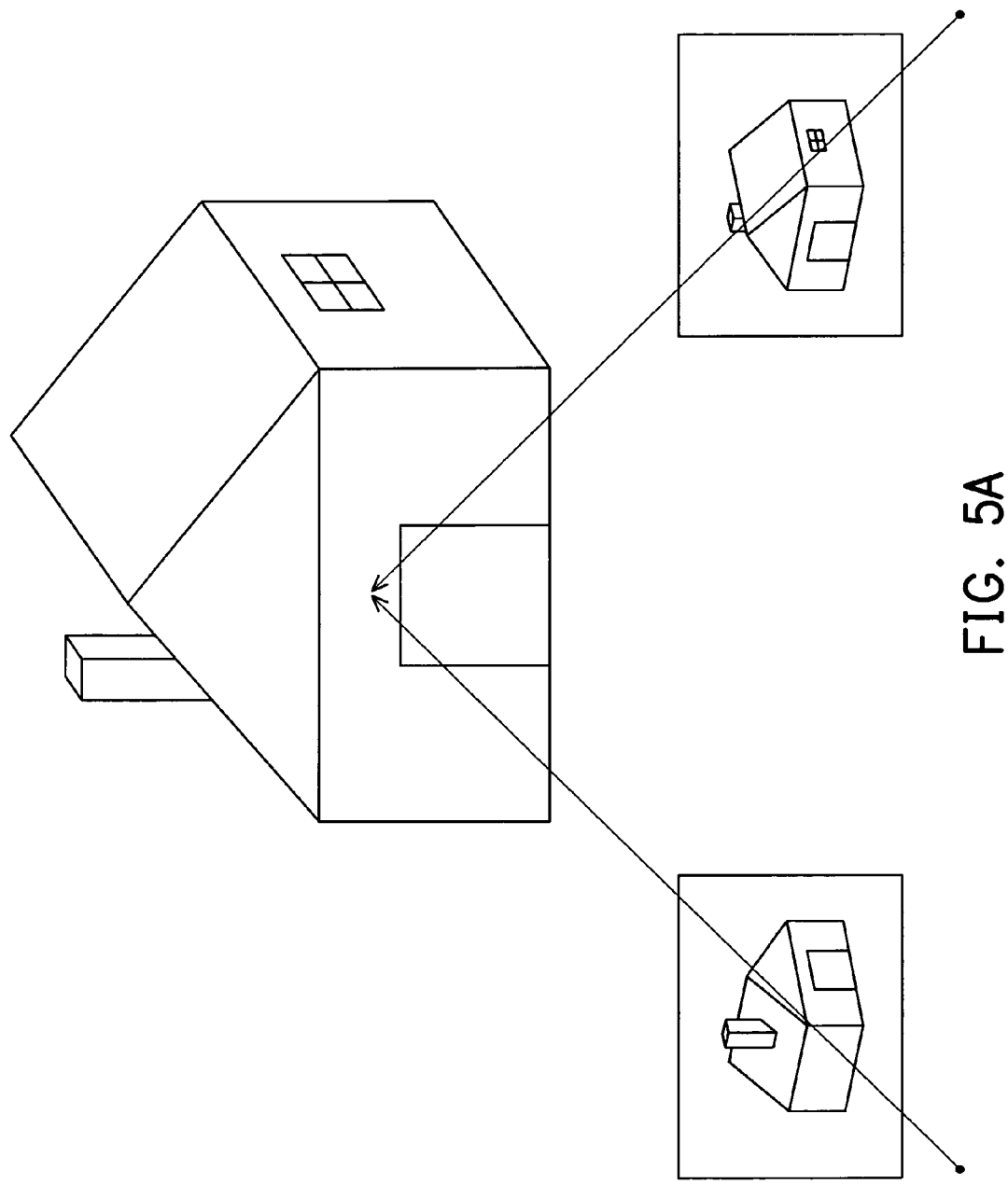
FIG. 5A is a diagram showing some major features of planar photography.
Figure 5B:
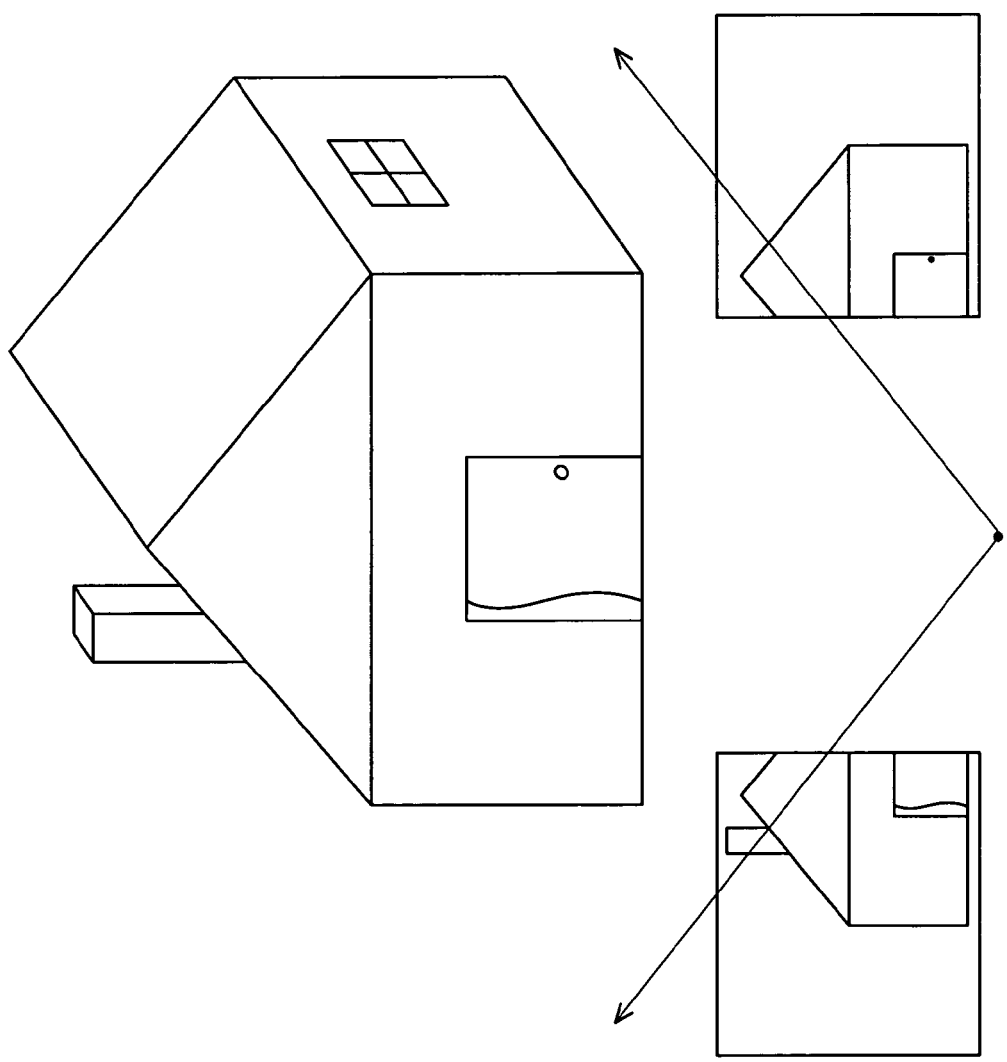
FIG. 5B is a diagram of a fixed imaging center.

In addition, the present invention also has some advantages. Because some of the image data obtained under a specified condition cannot be reconstructed into a 3D image, a planar photographing method as shown in FIG. 5A is used. Here, the object is not shooting at different angles. Another photographing method incapable of reconstructing a 3D image is shown in FIG. 5B. FIG. 5B is a diagram of a fixed imaging center. In other words, the object is photographed in the same location but with different shooting angles. The image data obtained using the two aforesaid photographing methods have all feature points being coplanar. Therefore, if the image data obtained according to the methods in FIGS. 5A and 5B, then all medium error values obtained through computation as shown in steps S207 and S209 of FIG. 2 will be directly set as the maximum values. Hence, no time is wasted to compute the median error values. As a result, the condition of running the computation to the last minute just to find that the image data is basically incapable of reconstructing a 3D image will not occur.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of rapidly establishing an image spatial relation using planar filtering limitation, comprising the steps of:
   getting a plurality of continuous image data at different shooting angles such that each image data contains a plurality of feature points;
   randomly selecting a preset number of feature points from each image data for performing a comparison, where the feature points from the same image data is defined as a compared group;
   computing an error value from each selected feature point to an epipolar line to produce a plurality of epipolar errors;
   arranging the epipolar errors in order for finding a median error value among the epipolar errors;
   determining if the selected feature points are coplanar;
   when the selected feature points are non-coplanar, then the selected feature points are used to perform an epipolar geometry fundamental matrix computation; and
   when the selected feature points are coplanar, then the median error value obtained is set as a maximum value.

2. The method of claim 1, wherein the steps for determining the selected feature points are coplanar or not further includes the following steps:
   obtaining a planar transformation matrix;
   subtracting one of the feature points of the compared group by the product of the planar transformation matrix and the other one of the feature points of the compared group to obtain a compared result;
   checking the compared result to determine whether the value is smaller than a threshold value;
   when the compared result is smaller than or equal to the threshold value, then two compared groups of feature points are determined to be coplanar; and
   when the compared result is greater than the threshold value, two compared groups of feature points are determined to be non-coplanar.

3. The method of claim 1, wherein if the selected group of feature points is non-coplanar, the method of rapidly building a spatial image relation includes the following steps:
   determining if a counting value is equal to a preset value;
   when the counting value is not equal to the preset value, 1 is added to the counting value and then the step of randomly selecting a group of feature points is repeated;
   when the counting value is equal to the preset value, all the median error values are arranged in order to find a smallest median error value; and
   using the set of selected matched feature points with smallest median error value to compute the values in the epipolar geometry fundamental matrix.

4. The method of claim 1, wherein the method also includes the following steps:
   determining whether the image data is obtained by performing a single planar photographing operation or by photographing from a fixed image center; and
   when the image data is obtained by performing a single photographing operation or by photographing from a fixed image center, the computation of the epipolar geometry matrix is determined unnecessary and the image data is regarded as invalid data.

5. The method of claim 4, wherein the step of determining whether the image data is obtained by performing a single planar photographing operation or by photographing from a fixed image center comprises the following sub-steps:
   determining whether all of the median error values are set as the maximum values;
   when all of the median error values are set as the maximum values, the image data is regarded as data obtained through a single planar photographing operation or by photographing from a fixed image center; and
   when not all of the median error values are set as the maximum values, the image data is regarded as data not obtained through a single planar photographing operation or by photographing from a fixed image center.

6. The method of claim 1, wherein if the selected feature points are coplanar and the median error value is set as the maximum value, further includes the following sub-steps:

checking a counting value to determine if it is equal to a preset value or not; and when the counting value is not equal to the preset value, 1 is added to the counting value and the steps of selecting the preset number of feature points are repeated.

7. The method of claim 1, wherein after getting the image data, further includes initializing the feature points of each image data.

* * * * *